(12) United States Patent
McCleskey

(10) Patent No.: US 7,057,104 B1
(45) Date of Patent: Jun. 6, 2006

(54) LARGE-RADIUS CONDUIT BODIES

(76) Inventor: Price C. McCleskey, 15715 Lindstrom Rd., Crosby, TX (US) 77532

( * ) Notice: Subject to any disclaimer, the term of this patent is extended or adjusted under 35 U.S.C. 154(b) by 0 days.

(21) Appl. No.: 10/880,814

(22) Filed: Jun. 30, 2004

(51) Int. Cl.
*H02G 3/04* (2006.01)

(52) U.S. Cl. .................. 174/48; 174/49; 174/68.1; 174/68.3; 174/24; 52/220.1; 248/300; 439/582

(58) Field of Classification Search .............. 174/48, 174/49, 68.1, 68.3, 19, 60, 24, 96; 52/220.1, 52/220.7; 439/207, 582; 248/300
See application file for complete search history.

(56) References Cited

U.S. PATENT DOCUMENTS

| | | | |
|---|---|---|---|
| 3,944,184 A * | 3/1976 | Fisch | 254/134.3 R |
| 4,936,478 A | 6/1990 | Bozdeck | |
| 5,234,018 A * | 8/1993 | Grachal et al. | 137/244 |
| 6,069,317 A | 5/2000 | Wagganer | |
| 6,527,302 B1 * | 3/2003 | Gault et al. | 285/125.1 |
| 6,580,029 B1 | 6/2003 | Bing | |

OTHER PUBLICATIONS

Appleton, FM8 Conduit Body Dimension, p. A-3, catalog, Jan. 2002.
Cooper Crouse-Hinds, Condulet (TM) Conduit Outlet Bodies, p. 1F, catalog, no date.

* cited by examiner

*Primary Examiner*—Dhiru R. Patel
(74) *Attorney, Agent, or Firm*—Kenneth A. Roddy

(57) ABSTRACT

Large-radius conduit box bodies for connecting electrical or telecommunications conduits have a body defining a chamber with an axial hub at one or both ends and at least one perpendicular hub defining passageways communicating with the chamber. The perpendicular hubs are adjoined to the body chamber with a large outwardly curved interior radius. The inner surface of the large radius eliminates sharp corners at the intersection of the hub passageways with the body chamber and provides a maximum radius of curvature for cables pulled through or passing through the chamber and hub passageways.

23 Claims, 8 Drawing Sheets

Conduit Body Dimensions (In Inches)

| Hub Size | A | B | C | D | E | F | G | H | J | K | L | M | N | P | R |
|---|---|---|---|---|---|---|---|---|---|---|---|---|---|---|---|
| 1/2" | 4.28 | 1.53 | 1.53 | 6.00 | 6.00 | 5.28 | 5.32 | 4.44 | 5.32 | 1.84 | 0.69 | 1.31 | 3.34 | 1.06 | 5.32 |
| 3/4" | 4.87 | 1.72 | 1.75 | 6.62 | 6.62 | 5.75 | 5.78 | 4.97 | 5.78 | 2.06 | 0.81 | 1.53 | 4.00 | 1.25 | 5.78 |
| 1" | 5.65 | 1.90 | 2.03 | 7.62 | 7.62 | 6.85 | 6.88 | 5.78 | 6.88 | 2.34 | 0.94 | 1.91 | 4.60 | 1.44 | 6.88 |
| 1-1/4" | 6.62 | 2.25 | 2.44 | 8.50 | 8.50 | 7.50 | 7.53 | 6.47 | 7.53 | 2.69 | 1.15 | 2.24 | 5.37 | 1.81 | 7.53 |
| 1-1/2" | 7.94 | 2.84 | 2.84 | 10.44 | 10.44 | 9.13 | 9.16 | 7.81 | 9.16 | 2.84 | 1.44 | 2.50 | 6.56 | 2.15 | 9.16 |
| 2" | 9.81 | 3.94 | 2.63 | 12.44 | 12.44 | 11.13 | 11.16 | 9.25 | 11.16 | 3.62 | 1.94 | 3.06 | 8.69 | 3.06 | 11.16 |
| 2-1/2" | 12.31 | 5.06 | 4.50 | 15.69 | 15.69 | 13.94 | 13.97 | 11.50 | 13.97 | 4.50 | 2.50 | 3.56 | 10.94 | 4.31 | 13.97 |
| 3" | 12.31 | 5.06 | 4.88 | 15.69 | 15.69 | 13.94 | 13.97 | 11.50 | 13.97 | 4.87 | 2.50 | 4.31 | 10.94 | 4.31 | 13.97 |
| 3-1/2" | 15.06 | 6.31 | 5.75 | 16.94 | 16.94 | 16.94 | 16.94 | 13.81 | 16.94 | 5.75 | 3.13 | 4.88 | 13.50 | 5.44 | 16.94 |
| 4" | 15.06 | 6.31 | 6.00 | 16.94 | 16.94 | 16.94 | 16.94 | 13.81 | 16.94 | 6.00 | 3.13 | 5.31 | 13.50 | 5.44 | 16.94 |

Fig. 4

Center Point (CP1 or CP2) of Radius From Centerline of Hub or Body

| Hub Size | Type LB, LL, LR | | | | Type T, TB, X | | | |
|---|---|---|---|---|---|---|---|---|
| | CP1 | IR | ER | CP2 | IR | ER |
| 1/2" | 2.46 | 1.93 | 1.69 | 1.61 | 1.09 | 0.85 |
| 3/4" | 2.67 | 2.04 | 1.80 | 1.76 | 1.14 | 0.90 |
| 1" | 3.57 | 2.85 | 2.62 | 2.26 | 1.54 | 1.31 |
| 1-1/4" | 3.88 | 2.97 | 2.75 | 2.50 | 1.60 | 1.38 |
| 1-1/2" | 4.57 | 3.50 | 3.15 | 3.00 | 1.93 | 1.58 |
| 2" | 6.56 | 5.03 | 4.59 | 4.09 | 2.57 | 2.13 |
| 2-1/2" | 8.25 | 6.10 | 5.72 | 5.39 | 3.24 | 2.86 |
| 3" | 8.25 | 6.10 | 5.72 | 5.39 | 3.24 | 2.86 |
| 3-1/2" | 9.41 | 6.69 | 6.25 | 6.59 | 3.88 | 3.44 |
| 4" | 9.41 | 6.69 | 6.25 | 6.59 | 3.88 | 3.44 |

Range of Interior Radius of Conduit Bodies

| Hub Size | Type LB, LL, LR | | | Type T, TB, X | | |
|---|---|---|---|---|---|---|
| | IR | FROM | TO | IR | FROM | TO |
| 1/2" | 1.93" | 1 7/8" | 2" | 1.09" | 1 1/16" | 1 1/8" |
| 3/4" | 2.04" | 2" | 2 1/8" | 1.14" | 1 1/16" | 1 3/16" |
| 1" | 2.85" | 2 13/16" | 2 15/16" | 1.54" | 1 1/2" | 1 5/8" |
| 1-1/4" | 2.97" | 2 15/16" | 3 1/16" | 1.60" | 1 9/16" | 1 11/16" |
| 1-1/2" | 3.50" | 3 7/16" | 3 9/16" | 1.93" | 1 7/8" | 2" |
| 2" | 5.03" | 4 15/16" | 5 1/16" | 2.57" | 2 1/2" | 2 5/8" |
| 2-1/2" | 6.10 | 5 15/16" | 6 1/8" | 3.24" | 3 3/16" | 3 5/16" |
| 3" | 6.10 | 5 15/16" | 6 1/8" | 3.24" | 3 3/16" | 3 5/16" |
| 3-1/2" | 6.69 | 6 5/8" | 6 3/4" | 3.88" | 3 13/16" | 3 15/16" |
| 4" | 6.69 | 6 5/8" | 6 3/4" | 3.88" | 3 13/16" | 3 15/16" |

Fig. 7

Conduit Body Wiring Capacity (In Cubic Inches)

| Hub Size | LB, LL, LR | T | TB, X |
|---|---|---|---|
| 1/2" | 7.50 | 10.00 | 10.00 |
| 3/4" | 12.00 | 12.00 | 15.00 |
| 1" | 20.00 | 30.00 | 30.00 |
| 1-1/4" | 36.00 | 36.00 | 45.00 |
| 1-1/2" | 66.50 | 70.00 | 70.00 |
| 2" | 155.00 | 180.00 | 180.00 |
| 2-1/2" | 300.00 | 300.00 | 300.00 |
| 3" | 417.00 | 417.00 | 417.00 |
| 3-1/2" | 570.00 | 570.00 | 570.00 |
| 4" | 620.00 | 620.00 | 620.00 |

LARGE-RADIUS CONDUIT BODIES

BACKGROUND OF THE INVENTION

1. Field of the Invention

This invention relates generally to electrical conduit box bodies for connecting conduits, and more particularly to improved electrical conduit box bodies having conduit connecting stub or hub portions adjoined to the chamber of the body portion by a large radius that eliminates sharp corners at the intersection of the hub passageways with the body chamber and provides a maximum radius of curvature for wire or cables pulled through or passing through the chamber and stub or hub passageways.

2. Background Art

Building codes require most electrical wiring to be enclosed in electrical conduits that may be connected to each other by way of electrical conduit boxes, junction boxes, or outlet boxes. The prior art type of conduit fittings or conduit box bodies which are pertinent to the present invention are known to those in the trade as "conduit bodies", some of which are recognized by tradenames such as "Unilets®" (Appleton Electric Co., Chicago, Ill.) and "Condulets®" (Crouse-Hinds Company, New York, N.Y.).

Such conduit boxes, junction boxes, outlet boxes, Unilets®, Condulets®, or conduit bodies typically have a generally oblong hollow rigid body defining a chamber with one open longitudinal side and spaced tubular "stubs" or "hubs" extending perpendicularly outward from the body at various locations, usually along loci separated by either 90° or 180°. The interior of the body and tubular stubs or hubs are accessible through the open longitudinal side of the box, and the open side of the body is closed by a removable cover plate, typically attached to the body by screws, and may include gasket for weathertight sealing.

The interior of the tubular stubs or hubs define a passageway communicating with the chamber defined by the body, and their outer ends are typically internally threaded for connection to conventional electrical conduits. Insulated wires or cables extend through the conduit into the body chamber where they may be spliced or joined. These insulated wires are designed to carry relatively high voltages and currents (carrying 0 up to 2000 volts and 0 up to 750 amps). Theses conduit bodies may also be used for conduit containing optic fibers and/or signal or control wires (i.e., wire operating at a lower voltage with a maximum of 110 volts down to millivolts, serving to actuate switches and thermostats, or, in the case of telephone and data, wire for communications and computers).

The bodies of these conduit boxes serve as pulling fittings and are designed, for example, for wire pulls such as straight wire pulls, angled wire pulls and Y wire pulls, and for making bends or sharp changes in the direction of the conduit system or "run". In this regard, conduit bodies are to be contrasted with elbows, which are bent portions of conduit. Electrical outlet boxes or "conduit bodies" are assigned various type designations (e.g., C, LB, LR, LL, T and X) depending on the number and locations of the conduit connecting stubs or hubs, and their size is designated by "hub size" (the size of the conduit connection—e.g., ½" through 4").

A common problem with conventional prior art conduit bodies, junction boxes, outlet boxes, Unilets®, and Condulets® is that the tubular stubs or hubs are very short and their length is governed by the optimal thread length required for thread engagement of the threaded ends of the conduit. Typically, the juncture of the interior of the tubular stubs or hubs with the interior of the chamber of the body is a relatively sharp corner at the transition surface where making a 90° angle, and no provision is made for providing a large transition radius for pulling wires or cables from the electrical conduit through the bodies. Thus, the electrical wires or cables are often damaged or seriously degraded when pulled over the relatively sharp corners encountered in the prior art conduit box fittings.

Bing, U.S. Pat. No. 6,580,029 discloses an electrical and telecommunications conduit body for connecting conduits. The conduit body includes an inwardly curved guide surface disposed between the chamber ends of the hub passageways, which functions to maintain a minimum radius of curvature of cables passing through the passageway defined by one hub and then through the chamber defined by the body to the other hub passageway so as to avoid pulling the cables over sharp corners at the intersections of the hub passageways with the body chamber. The guide surface may be a raised hump or in inwardly curved portion of the bottom wall or side wall of the body disposed adjacent to the perpendicular hub which extends inwardly into the body chamber toward the center of body and has a radius of curvature sized to provide a minimum radius of curvature for optical fiber cables prescribed by telecommunications industry standards (BICSI). Alternatively the minimum radius guide surface may be formed on a separate member that is inserted into the chamber of conventional conduit bodies. These configurations are undesirable since they reduce the volume and working space of the interior chamber.

Wagganer, U.S. Pat. No. 6,069,317 discloses an improved junction box for perpendicularly conducting stiff electrical cable, wherein the improvement includes one removable end wall of the housing that is replaceably attached to the base and side walls of the elongate housing. When the cover and end wall are removed, a clear passage is provided to facilitate running stiff electrical cable through the perpendicular stub or hub and bending it perpendicularly through the housing.

Bozdeck, U.S. Pat. No. 4,936,478 discloses a universal conduit fitting for attachment to at least one conduit. The fitting has a generally rectangular elongated unitary body with a back wall, opposed end walls, and two front corner walls defining elongated openings on three sides and an interior compartment. The end walls each have an outwardly extending hollow shank communicating with the interior compartment and having means for attaching to an end of a conduit. Three substantially planar cover plates attach to the body to cover the three elongated openings and enclose the interior compartment. One or more of the covers includes at least one shank formed thereon communicating with the interior compartment and having means for attaching to an end of a second conduit extending along a locus substantially perpendicular to the plane of the cover.

The present invention is distinguished over the prior art in general, and these patents in particular by electrical conduit box bodies having an axial conduit connecting stub or hub portion adjoined to the chamber of the body portion at one or both ends, and at least one perpendicular stub or hub portion defining passageways communicating with the chamber. The perpendicular stub or hub portion is adjoined to the chamber by a large outwardly curved interior radius that eliminates sharp corners at the intersection of the hub passageways with the body chamber and provides a maximum radius of curvature for wires or cables pulled through or passing through the chamber and stub or hub passageways.

SUMMARY OF THE INVENTION

It is therefore an object of the present invention to overcome disadvantages in prior electrical conduit bodies of the indicated character and to provide an improved conduit body which facilitates pulling wires and cables therethrough without pulling them over relatively sharp corners and without damage.

It is another object of this invention to provide improved conduit bodies adapted to maintain a large bend radius that protects wires and cables and prevents them from exceeding their minimum bend radius as recommended by recognized industry standards.

Another object of this invention is to provide improved conduit bodies that effect a smooth transition while wires and cables are pulled from one conduit through the conduit body to another conduit while maintaining an optimal bend radius.

A further object of this invention is to provide improved conduit bodies particularly adapted for replacing or retrofitting type LB, LL, LR, T, TB, and X conduit bodies.

A still further object of this invention is to provide improved conduit bodies that are economical to manufacture and reliable in operation.

Other objects of the invention will become apparent from time to time throughout the specification and claims as hereinafter related.

The above noted objects and other objects of the invention are accomplished by the present electrical conduit box bodies having an axial conduit connecting stub or hub portion adjoined to the chamber of the body portion at one or both ends, and at least one perpendicular stub or hub portion defining passageways communicating with the chamber. The perpendicular stub or hub portion is adjoined to the chamber by a large outwardly curved interior radius that eliminates sharp corners at the intersection of the hub passageways with the body chamber and provides a maximum radius of curvature for wires or cables pulled through or passing through the chamber and stub or hub passageways.

BRIEF DESCRIPTION OF THE DRAWINGS

FIG. 4 is a table of the dimensions of the present conduit bodies.

FIG. 5 is a table of the interior radius and exterior radius dimensions of the present conduit bodies.

FIG. 6 is a table of the preferred range of the interior radius dimensions of the present conduit bodies.

FIG. 7 is a table of the wiring capacity dimensions of the present conduit bodies.

DESCRIPTION OF THE PREFERRED EMBODIMENT

The present invention is a significant improvement in conduit enclosures, conduit boxes, junction boxes, and outlet boxes, and particularly those types known to those in the trade as "conduit bodies", some of which are recognized by tradenames such as "Unilets®" (Appleton Electric Co., Chicago, Ill.) and "Condulets®" (Crouse-Hinds Company, New York, N.Y.). In the following discussion, the conduit boxes of the present invention will be referred hereinafter as "conduit bodies".

Figures 1, 2:
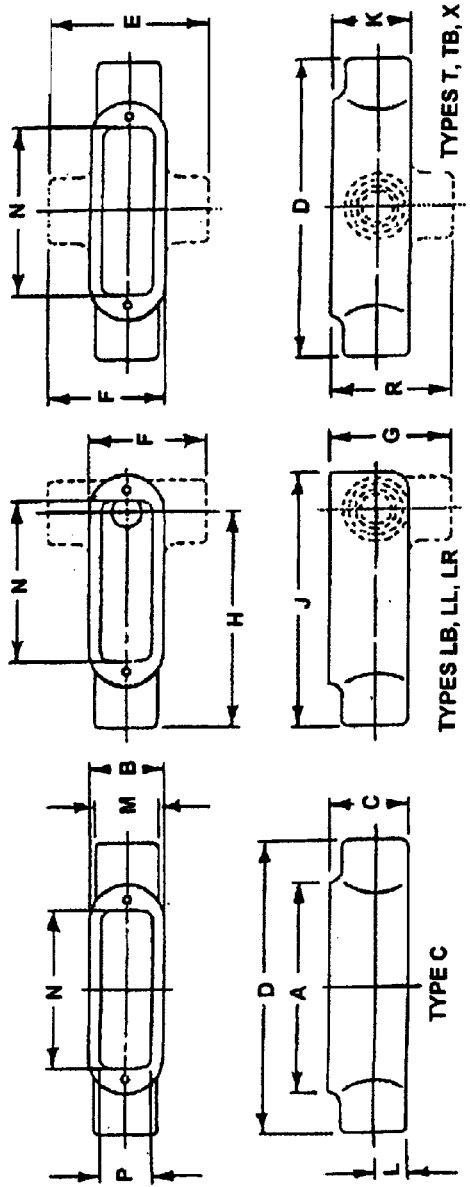
FIG. 1 is a top plan view and a side elevation, respectively, of typical prior art type C; type LB, LL, and LR; and type T, TB, and X conduit bodies.
FIG. 2 is a table of the dimensions of the prior art conduit bodies of FIG. 1.

FIG. 1, and the table of FIG. 2 illustrate typical prior art conduit bodies and dimensions of type C, LB, LL, LR, T, TB, and X (FM8™—Appleton Electric Co., Chicago, Ill.). As discussed above, such conduit bodies have a generally oblong hollow rigid body defining a chamber with one open longitudinal side and spaced tubular "stubs" or "hubs" extending perpendicularly outward from the body at various locations, usually along loci separated by either 90° or 180°. The interior of the body and tubular stubs or hubs are accessible through the open longitudinal side of the box, and the open side of the body is closed by a removable cover plate, typically attached to the body by screws, and may include gasket for weathertight sealing.

The conduit bodies are assigned various type designations (e.g., LB, LL, LR, T, TB, and X) depending on the number and locations of the "stubs" or "hubs". The "L" types provide a right angle turn extending oppositely away from the longitudinal open side or removable cover and are defined by holding the conduit body as if it were a pistol, gripping the stub or hub as a handle and pointing the long portion of the conduit body forward, as you would a pistol barrel. If the longitudinal opening or removable cover is on top or on the back of the conduit body, it is an LB, with the "B" standing for "back" and it provides a right angle turn extending oppositely away from the removable cover (through the bottom). If the opening or cover is on the left side of the conduit body, then it is an "LL," the "L" standing for "left" and it provides a right angle turn extending to the left of the removable cover. If the opening or cover is on the right side of the conduit body, then it is an "LR," with the "R" standing for "right" and it provides a right angle turn to the right of the removable cover A "T" or "TEE" or "TB" conduit body is formed in the shape of a "T" with a threaded stub or hub raceway entry at the end of each leg and a longitudinal open side or removable cover on one side. The "X" conduit body is shaped as a "cross" and has four threaded stub or hub raceway entries with a cover on one side of the conduit body.

Also, as discussed above, and as can be seen in FIG. 1, the tubular stubs or hubs of the prior art conduit bodies are very short and the juncture of the interior of the tubular stubs or hubs with the interior of the chamber of the body is a relatively sharp corner at the transition surface where making a 90° angle, and no provision is made for providing a large transition radius for pulling wires or cables from the electrical conduit through the bodies. Thus, the electrical wires or cables are often damaged or seriously degraded when pulled over the relatively sharp corners encountered in the prior art conduit bodies.

Figure 8:
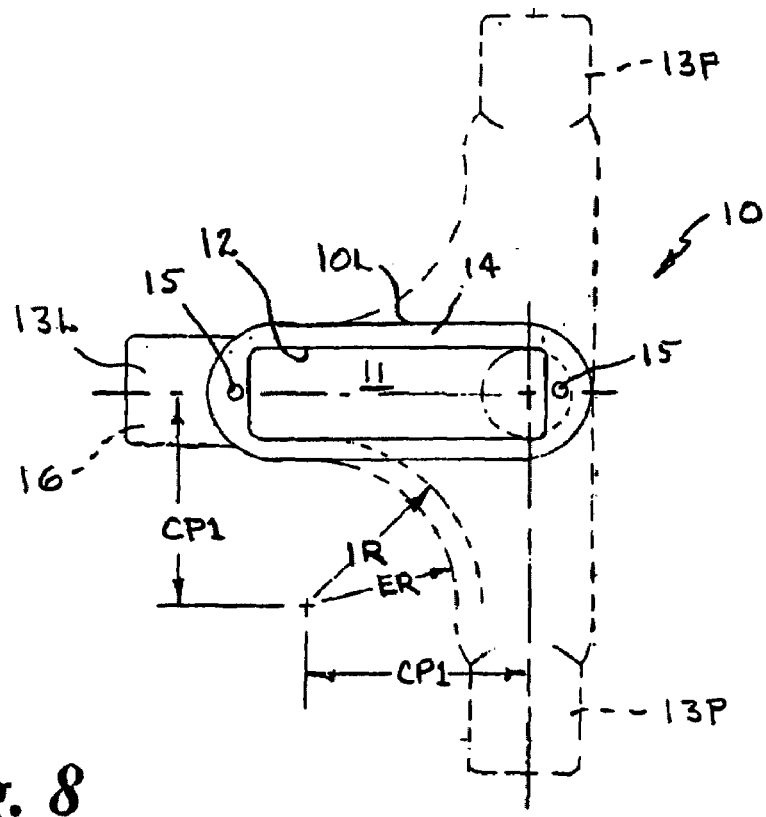
FIGS. 8 and 9 are a top plan view and a side elevation, respectively, of the conduit bodies of the present type LB, LL and LR conduit bodies, shown in larger scale and with the perpendicular hubs represented in dashed line.
Figure 9:
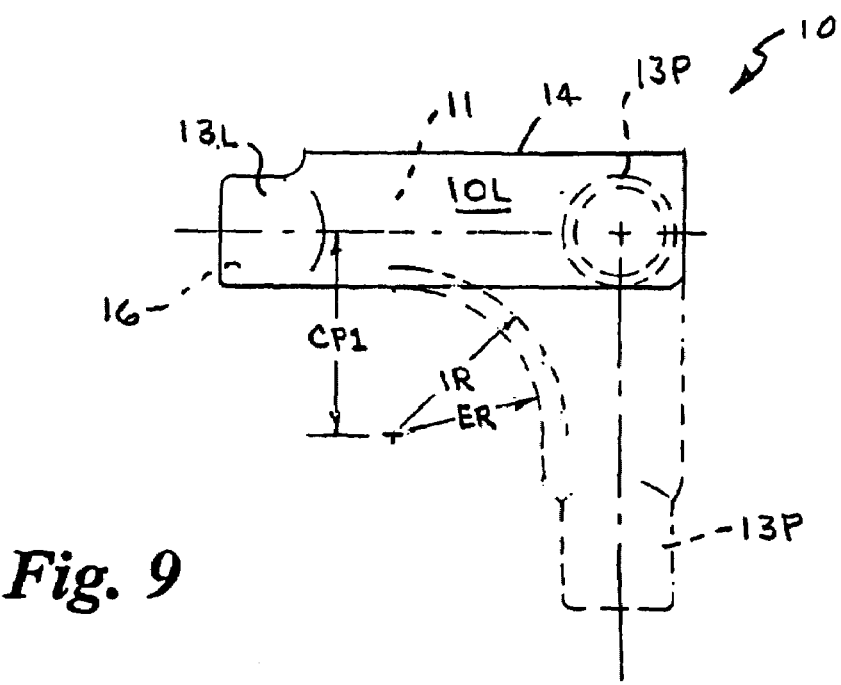
Figure 8A:
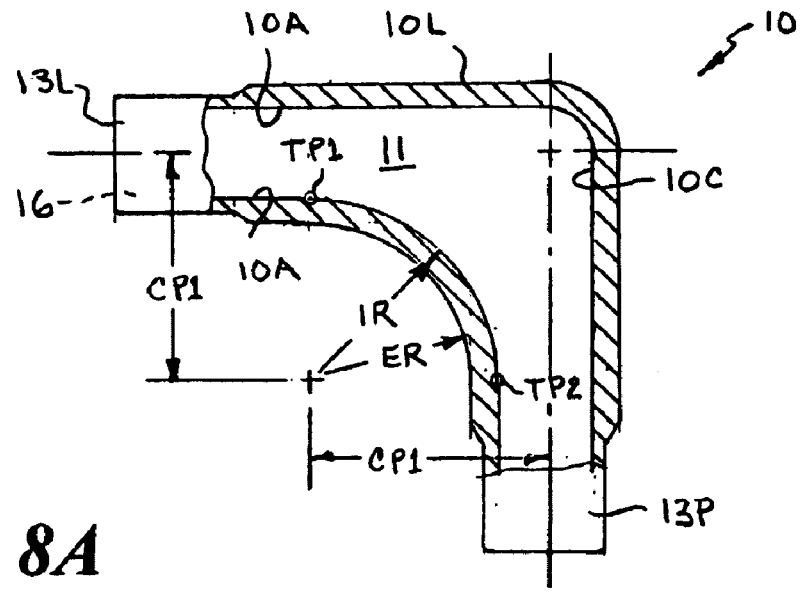
FIGS. 8A and 9A are partial longitudinal cross section views of a type LR conduit body as seen from the top and a type LB conduit body as seen from the side, respectively, showing the interior radius.
Figure 9A:
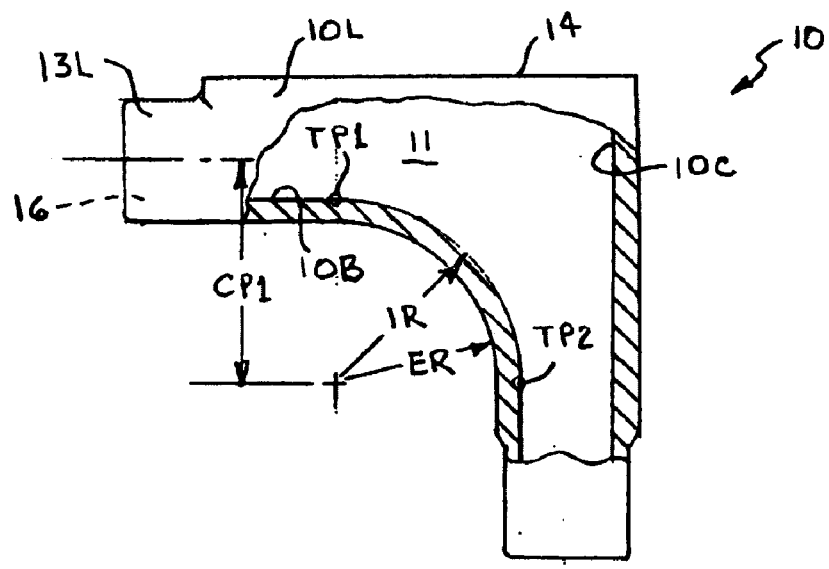
Figure 10:
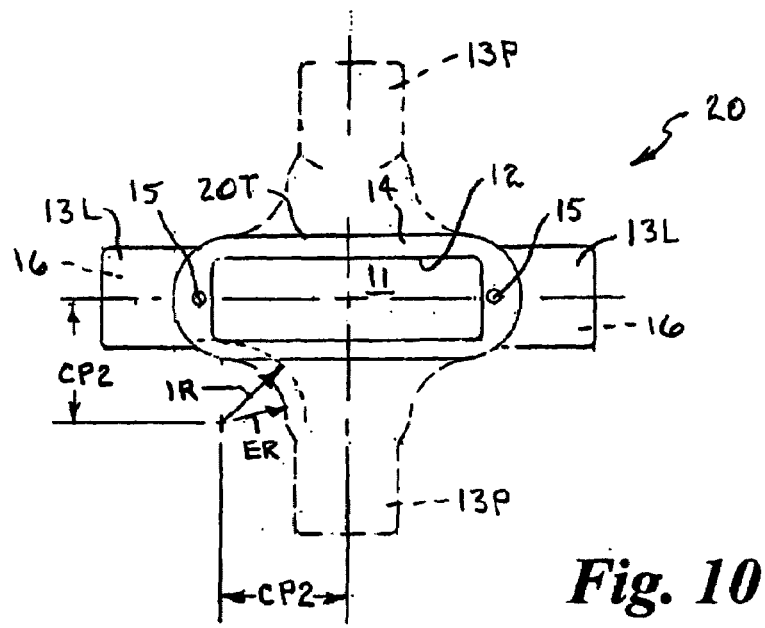
FIGS. 10 and 11 are a top plan view and a side elevation, respectively, of the conduit bodies of the present type T, TB and X conduit bodies, shown in larger scale and with the perpendicular hubs represented in dashed line.
Figure 11:
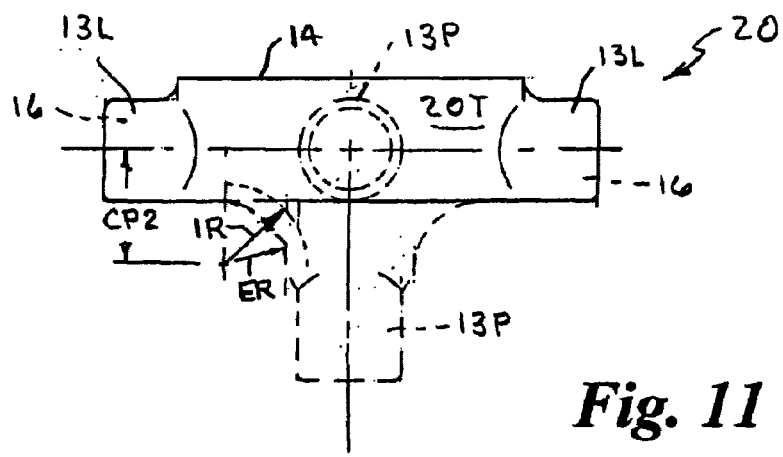
Figure 10A:
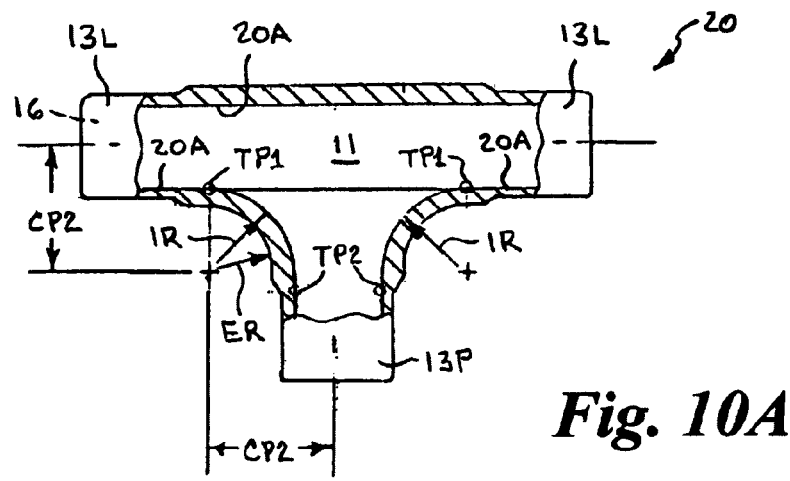
FIGS. 10A and 11A are partial longitudinal cross section views of a type T conduit body as seen from the top and a type TB conduit body as seen from the side, respectively, showing the interior radii.
Figure 11A:
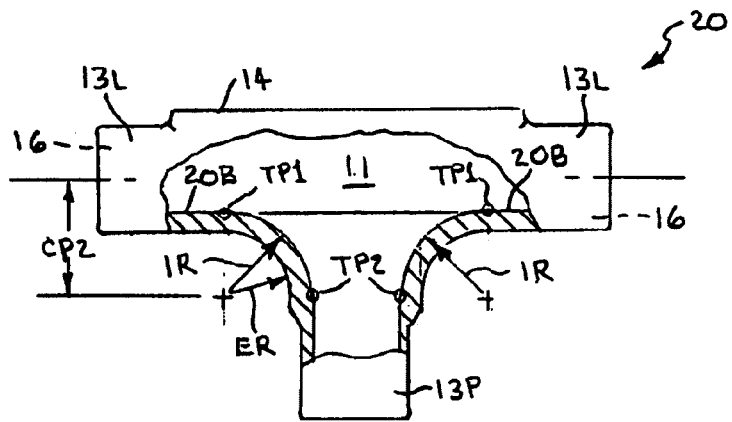

Referring now to FIGS. 3 through 11, and the table of FIGS. 4 through 7, the conduit bodies in accordance with the present invention will be described. FIGS. 8 and 9 are a top plan view and a side elevation, respectively, of the type LB, LL and LR conduit bodies in accordance with the present invention. FIGS. 8A and 9A are partial longitudinal cross section views of a type LR conduit body as seen from the top and a type LB conduit body as seen from the side, respectively, showing the interior radius. FIGS. 10 and 11 are a top plan view and a side elevation, respectively, of the type T, TB and X conduit bodies in accordance with the present invention. FIGS. 10A and 11A are partial longitudinal cross section views of a type T conduit body as seen from the top and a type TB conduit body as seen from the side, respectively, showing the interior radii.

The present type LB, LL and LR conduit bodies 10 have a generally oblong hollow rigid body 10L with opposed longitudinal side walls 10A, a contiguous bottom wall 10B enclosed at one end by and end wall 10C defining an interior chamber 11, a longitudinal opening 12 on one side of the body, an integral tubular longitudinally disposed stub or hub 13L adjoined to the open end of the chamber of the body, and an integral hub 13P adjoined to either side wall, or the bottom wall of the chamber by a large radius (described hereinafter) and extending perpendicularly outward from the body. The perpendicular hubs 13P are represented in dashed line.

A "T" or "TEE" or "TB" conduit body is formed in the shape of a "T" with a threaded stub or hub raceway entry at the end of each leg and a longitudinal open side or removable cover on one side. The "X" conduit body is shaped as a "cross" and has four threaded stub or hub raceway entries with a cover on one side of the conduit body.

The present type T, TB and X conduit bodies 20 have a generally oblong hollow rigid body 20T with opposed longitudinal side walls 20A, a contiguous bottom wall 20B, defining an interior chamber 11, an integral tubular longitudinally disposed stub or hub 13L at each end of the chamber, a longitudinal opening 12 on one side of the body, and an integral hub 13P that is adjoined to either side wall of the chamber (type T), to the bottom wall of the chamber (type TB), or to both opposed walls of the chamber (type X), by a large radius (described hereinafter) and extends perpendicularly outward from the body.

The interior chamber 11 of the bodies 10 or 20 and tubular stubs or hubs 13L and 13P are accessible through the longitudinal opening 12. A flat surface 14 surrounds the opening 12 and is provided with threaded holes 15 for attaching a conventional removable cover plate by screws, and a conventional gasket (not shown) may be provided for weathertight sealing. The interior of the tubular stubs or hubs 13L and 13P define a passageway communicating with the chamber 11, and their outer ends are preferably internally threaded 16 for connection to conventional electrical conduits having threaded ends ranging in size from ½" through 4", hereinafter referred to as the "hub size".

Figure 3:
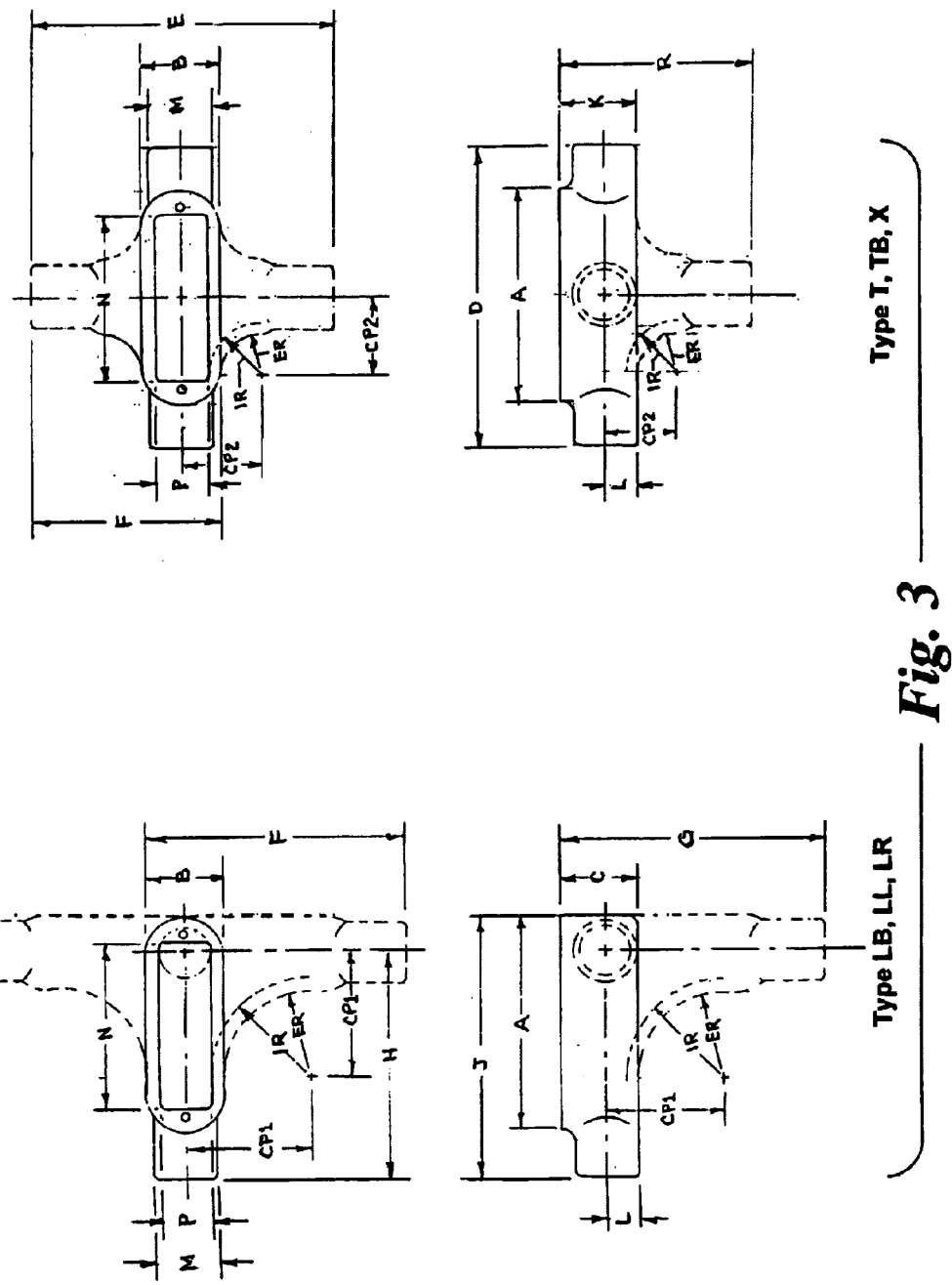
FIG. 3 is a top plan view and a side elevation, respectively, of the type LB, LL, and LR; and type T, TB and X conduit bodies in accordance with the present invention.

For purposes of discussing the configuration and dimensions, the ½" hub size type LB, LL, and LR conduit bodies in accordance with the present invention will be described as an example. As represented in the table of FIG. 3, the ½" hub size type LB, LL, and LR conduit bodies 10L have a longitudinal opening 12 which has a width "P" of about 1 1/16" (1.06") and a longitudinal length "N" of about 3 11/32" (3.34"). The flat surface 14 surrounding the opening has a longitudinal length "A" of about 4 9/32" (4.28") and a width "B" of about 1 17/32" (1.53"). The conduit body 10L has a longitudinal length "J" of about 5 5/16" (5.32") from the outer end of the longitudinally disposed hub 13L to the far end of the body. The LL and LR bodies have a lateral length "F" of about 5 9/32" (5.28") from the outer end of the perpendicularly disposed hub 13P to the far side of the body. The type LB bodies have a length "G" of about 5 5/16" (5.32") from the top of the flat surface 14 to the outer end of the perpendicularly disposed hub 13P. The centerline of the perpendicularly disposed hub is disposed a distance "H" of about 4 7/16" (4.44") from the outer end of the longitudinally disposed hub. The perpendicularly disposed hub 13P has a larger diameter cylindrical portion, which has an outer diameter of approximately the same dimension as the width "B" of the body, and the outer end of the longitudinal and perpendicular hubs 13L and 13P have a smaller cylindrical outer end portion with an outer diameter "M" of about 1 5/16" (1.31").

In the type LL and LR conduit bodies, the perpendicular hub 13P extends outwardly one of the longitudinal side walls 10A and its outer end is disposed a distance from the outer surface of the opposed one of the longitudinal side walls approximately the same distance as the overall length of the body. In the type LB conduit bodies, the perpendicular hub 13P extends outwardly from the bottom wall 10B of the body and its outer end is disposed a distance from the flat surface 14 surrounding the opening 12 approximately the same distance as the overall length of the body.

As represented in the table of FIG. 3, the ½" hub size type T, TB and X conduit bodies 20T have a longitudinal opening 12 which has a width "P" of about 1 1/16" (1.06") and a longitudinal length "N" of about 3 11/32" (3.34"). The flat surface 14 surrounding the opening has a longitudinal length "A" of about 4 9/32" (4.28") and a width "B" of about 1 17/32" (1.53"). The conduit body 20T has a longitudinal length "D" of about 6" (6.00") from the outer ends of the opposed longitudinally disposed hubs 13L. The ½" size type T body has a lateral length "F" of about 5 9/32" (5.28") from the outer end of the perpendicularly disposed hub 13P to the far side of the body. The ½" size type X body has a transverse length "E" of about 6" (6.00") from the outer ends of the laterally opposed perpendicularly disposed hubs 13P. The type TB body has a length "R" of about 5 5/16" (5.32") from the top of the flat surface 14 to the outer end of the perpendicularly disposed hub 13P. In the type T, TB and X conduit bodies, the centerline of the perpendicularly disposed hub is disposed at the center of the body, or a distance approximately one-half the distance from the outer end of the longitudinally disposed hubs.

In the type T conduit bodies, the outer end of the perpendicular hub 13P is disposed a distance from the center of the body approximately one-half of the distance of the overall length of the body. In the type TB conduit bodies, the outer end of the perpendicular hub 13P extends outwardly from the bottom wall 20B and its outer end is disposed a distance from the flat surface 14 surrounding the opening 12 which is greater than one-half of the overall length of the body. In the type X conduit bodies, the outer ends of the perpendicular hubs 13P are disposed a distance apart approximately the same distance as the overall length of the body.

Interior Radius

As discussed above, in the example of the ½" hub size type LB, LL, and LR conduit bodies, the longitudinal opening 12 has a width "P" of about 1 1/16" (1.06"), and the flat surface 14 surrounding the opening has a width "B" of about 1 17/32" (1.53"). The width "P" of the opening is typically substantially the same as the width of the interior chamber. The wall thickness of the body is typically one-half the difference between the flat surface width "B" and the opening width "P". Thus, in the example, the wall thickness would be: (1.53"−1.06")/2=0.24", or about 15/64" or roughly ¼". The inside surfaces of the opposed longitudinal side walls of the chamber would be a distance of about 17/32" laterally outward from the centerline of the longitudinal axis of the body.

As best seen in FIGS. 8A and 9A, the side wall 10A (type LL or LR) or bottom wall 10B (type LB) of the body on which the perpendicularly disposed hub 13P is adjoined is provided with an integrally formed large interior radius IR which curves outwardly from the chamber 11 in a smooth uninterrupted curve from a tangent point TP1 on an inner facing surface of either of one of the longitudinal side walls 10A or the bottom wall 10B to a tangent point TP2 on the interior diameter of the perpendicular hub.

As best seen in FIGS. 10A and 11A, with the type T, TB and X bodies, there are two laterally opposed interior radii IR integrally formed on the body adjoining the chamber interior with the interior passageway of the perpendicular hub 13P, each curving outwardly from the chamber in diametrically opposed relation in a smooth uninterrupted curve from a tangent point TP1 on an inner facing surface of either of one of the longitudinal side walls 20A or the bottom wall 20B to a tangent point TP2 on the interior diameter of the perpendicular hub.

Since the larger inside radius "IR" is what the wires or cables are pulled over, preferably it would be as large as possible. For example in the ½" type LB, LL, and LR conduit bodies, a larger interior radius "IR" of about 1 15/16" (1.93") having a center point CP1 disposed a distance of about 2 15/32" (2.46") from the longitudinal axis or centerline of the body and the axis or center line of the perpendicular hub 13P provides an interior radius that extends from a tangent point TP1 on the side wall 10A or bottom wall 10B of the chamber to a tangent point TP2 on the inside diameter of the perpendicular hub.

In the example of the ½" type T, TB and X conduit bodies, a larger interior radius "IR" of about 1 3/32" (1.09") having a center point CP2 disposed a distance of about 1 5/8" (1.61") from the longitudinal axis or centerline of the body and the axis of center line of the perpendicular hub 13P provides an interior radius that extends from a tangent point TP1 on the side wall 20A, or bottom wall 20B of the chamber to a tangent point TP2 on the inside diameter of the perpendicular hub.

Exterior Radius

The smaller exterior radius ER is calculated by subtracting the wall thickness from the interior radius IR. Thus, in the ½" type LB, LL and LR example, the smaller exterior radius ER would be: ER=(IR−0.24")=(1.93"−0.24")=1.69", or about 1 11/16" (1.69"). In the ½" type T, TB, X example, the smaller exterior radius ER would be: ER=(IR−0.24")= (1.09"−0.24")=0.85", or about 27/32" (0.85").

The exterior radius ER extends from a tangent point on the exterior of the longitudinal side wall side of the body 10L (type LL or LR) or the bottom wall (type LB) to a tangent point on one side of the larger exterior diameter of the perpendicularly disposed hub 13P. The remaining circumferential portion of the larger exterior diameter of the perpendicularly disposed hub extends straight and blends into the end wall of the closed end of the body. With the type T, TB and X bodies 20T, there are two laterally opposed exterior radii ER, each extending in a curve from a tangent point on the exterior of the longitudinal side wall or bottom wall to tangent points on diametrically opposed sides of the larger exterior diameter of the perpendicularly disposed hub.

The dimensions of the various other size conduit bodies and their interior radius IR and exterior radius ER are given in the tables of FIGS. 4 and 5, respectively. The dimensions shown in FIG. 5 for the interior radius IR is the theoretical dimension, however, the table of FIG. 6 shows the preferred range of the interior radius dimension after rounding off and taking manufacturing tolerances into consideration. For example, in the ½" type LB, LL, and LR conduit bodies, the preferred range of the larger interior radius "IR" (theoretical dimension=1.93" or 15/16") is from about 1 7/8" to about 2".

The conduit bodies of the present invention may be formed by castings of malleable iron or aluminum, or moldings of suitable plastic material such as polyvinyl chloride (PVC). As described above, the hubs are preferably threaded with inside female tapered threads to mate with male tapered threads cut on the end of a conduit (in the case of Intermediate Metal Conduit (IMC) or HW conduit), however, they may also be smooth and provided with set screws that tightly hold a conduit in place (in the case of EMT or thin wall conduit), or smooth for bonding a conduit permanently in place (in the case of PVC or plastic conduit).

The conduit bodies of the present invention are applicable to conduits for carrying power cable or wire, signal wire or cable and fiber optic cable. The large interior radius IR provides a maximum bending radius in the conduit body and effects a smooth transition between the longitudinally disposed hub and the perpendicularly disposed hub that facilitates pulling the wires or cables through the conduit body without damaging the cables and eliminates sharp corners.

The large interior radius IR also provides a chamber having a significantly larger interior volume than conventional conduit bodies. For example, as represented in the chart of FIG. 7, the ½" size type LB, LL and LR conduit bodies have an interior volume (wiring capacity) of about 7½", and the type T, TB and X conduit bodies have an interior volume (wiring capacity) of about 10".

While this invention has been described fully and completely with special emphasis upon preferred embodiments, it should be understood that within the scope of the appended claims, the invention may be practiced otherwise than as specifically described herein.

What is claimed is:

1. An electrical and telecommunications conduit body, comprising;

a unitary generally L-shaped body having opposed longitudinal side walls and a contiguous bottom wall extending along a longitudinal axis defining a chamber having an interior with an opening on one side of said body, an end wall adjoining said longitudinal side walls and said contiguous bottom wall and enclosing one end of said chamber, at least one tubular axial hub extending axially outward from said body at the end opposite said end wall terminating in an outer end and defining an interior passageway communicating with said chamber, at least one tubular perpendicular hub spaced near said end wall extending outwardly from either of one of said longitudinal side walls or said bottom wall along an axis perpendicular to said longitudinal axis terminating in an outer end and defining an interior passageway communicating with said chamber;

a flat surface surrounding said opening on one side of said body and threaded apertures in said flat surface adapted to attach a removable cover by screws for closing said open side of said body; and a large interior radius integrally formed on said body adjoining said chamber interior with said interior passageway of said perpendicular hub curving outwardly from said chamber in a smooth uninterrupted curve from a tangent point on an inner facing surface of either of one of said longitudinal side walls or said bottom wall to a tangent point on said perpendicular hub interior passageway and having a predetermined radius of curvature of sufficient magnitude to facilitate the running, bending and pulling of wires and cables perpendicularly through said conduit body without damage.

2. The conduit body according to claim 1, wherein
said body has an overall length from the outer end of said axial hub to the outer surface of said end wall; and
said at least one tubular perpendicular hub extends outwardly one of said longitudinal side walls and its said outer end is disposed a distance from an outer surface of the opposed one of said longitudinal side walls approximately the same distance as the overall length of said body.

3. The conduit body according to claim 1, wherein
said body has an overall length from the outer end of said axial hub to the outer surface of said end wall; and
said at least one tubular perpendicular hub extends outwardly from said bottom wall and its said outer end is disposed a distance from said flat surface approximately the same distance as the overall length of said body.

4. The conduit body according to claim 1, wherein
said large interior radius has a radius of from about 1⅞" to about 2".

5. The conduit body according to claim 1, wherein
said large interior radius has a radius of from about 2" to about 2⅛".

6. The conduit body according to claim 1, wherein
said large interior radius has a radius of from about 2¹³⁄₁₆" to about 2¹⁵⁄₁₆".

7. The conduit body according to claim 1, wherein
said large interior radius has a radius of from about 2¹⁵⁄₁₆" to about 3¹⁄₁₆".

8. The conduit body according to claim 1, wherein
said large interior radius has a radius of from about 3⁷⁄₁₆" to about 3⁹⁄₁₆".

9. The conduit body according to claim 1, wherein
said large interior radius has a radius of from about 4¹⁵⁄₁₆" to about 5¹⁄₁₆".

10. The conduit body according to claim 1, wherein
said large interior radius has a radius of from about 5¹⁵⁄₁₆" to about 6⅛".

11. The conduit body according to claim 1, wherein
said large interior radius has a radius of from about 6⅝" to about 6¾".

12. An electrical and telecommunications conduit body, comprising;
a unitary body having opposed longitudinal side walls and a contiguous bottom wall extending along a longitudinal axis defining a chamber having an interior with an opening on one side of said body, a pair of tubular axial hubs each extending axially outward from respective opposed ends of said body terminating in an outer end and defining an interior passageway communicating with said chamber, at least one tubular perpendicular hub spaced intermediate said axial hubs extending outwardly from either of one of said longitudinal side walls or said bottom wall along an axis perpendicular to said longitudinal axis terminating in an outer end and defining an interior passageway communicating with said chamber;
a flat surface surrounding said opening on one side of said body and threaded apertures in said flat surface adapted to attach a removable cover by screws for closing said open side of said body; and
a pair of interior radii integrally formed on said body adjoining said chamber interior with said interior passageway of said perpendicular hub each curving outwardly from said chamber in diametrically opposed relation in a smooth uninterrupted curve from a tangent point on an inner facing surface of either of one of said longitudinal side walls or said bottom wall to a tangent point on said perpendicular hub interior passageway and having a predetermined radius of curvature of sufficient magnitude to facilitate the running, bending and pulling of wires and cables perpendicularly through said conduit body without damage.

13. The conduit body according to claim 12, wherein
said unitary body has a generally T-shaped configuration with an overall length between the outer ends of said axial hubs;
said at least one perpendicular hub is a perpendicular hub extending outwardly in from one of said longitudinal side walls intermediate opposed ends of said body; and
the outer end of said perpendicular hub is disposed a distance from the center of said body approximately one-half of the distance of the overall length of said body.

14. The conduit body according to claim 12, wherein
said unitary body has a generally T-shaped configuration with an overall length between the outer ends of said axial hubs; and
said at least one perpendicular hub extends outwardly from said bottom wall and its said outer end is disposed a distance from said flat surface which is greater than one-half of the overall length of said body.

15. The conduit body according to claim 12, wherein
said unitary body has a generally cross-shaped configuration with an overall length between the outer ends of said axial hubs;
said at least one perpendicular hub is a pair of perpendicular hubs each extending outwardly in axially opposed relation from a respective one of said longitudinal side walls intermediate opposed ends of said body; and
the outer ends of said perpendicular hubs are disposed a distance apart approximately the same distance as the overall length of said body.

16. The conduit body according to claim 12, wherein
each of said radii has a radius of from about 1¹⁄₁₆" to about 1⅛".

17. The conduit body according to claim 12, wherein
each of said radii has a radius of from about 1¹⁄₁₆" to about 1³⁄₁₆".

18. The conduit body according to claim 12, wherein
each of said radii has a radius of from about 1½" to about 1⅝".

19. The conduit body according to claim 12, wherein
each of said radii has a radius of from about 1⁹⁄₁₆" to about 1¹¹⁄₁₆".

20. The conduit body according to claim 12, wherein
each of said radii has a radius of from about 1⅞" to about 2".

21. The conduit body according to claim 12, wherein
each of said radii has a radius of from about 2½" to about 2⅝".

22. The conduit body according to claim 12, wherein
each of said radii has a radius of from about 3³⁄₁₆" to about 3⁵⁄₁₆".

23. The conduit body according to claim 12, wherein
each of said radii has a radius of from about 3¹³⁄₁₆" to about 3¹⁵⁄₁₆".

* * * * *